United States Patent [19]

Palmer

[11] Patent Number: 4,832,235
[45] Date of Patent: May 23, 1989

[54] SELF-MEASURING CONDIMENT CAP

[76] Inventor: Warren C. Palmer, 13102 Goodnough Dr. NW., Gig Harbor, Wash. 98335

[21] Appl. No.: 48,645

[22] Filed: May 11, 1987

[51] Int. Cl.⁴ .............................................. G01F 11/10
[52] U.S. Cl. .................................. 222/370; 222/430; 222/548
[58] Field of Search ................. 222/42, 370, 480, 482, 222/543, 546, 548, 430, 425, 427, 452

[56] References Cited

U.S. PATENT DOCUMENTS

| | | | |
|---|---|---|---|
| 582,972 | 5/1897 | Austin . | |
| 960,650 | 6/1910 | Lind . | |
| 2,002,039 | 5/1935 | McPhee | 221/109 |
| 2,018,389 | 10/1935 | Wagner | 225/26 |
| 2,053,631 | 9/1938 | Punte | 221/117 |
| 2,660,344 | 11/1953 | Starner | 222/548 |
| 2,718,336 | 9/1955 | Rochow | 222/142.9 |
| 2,877,937 | 3/1959 | Weir | 222/452 |
| 2,890,816 | 6/1959 | Horland | 222/142.3 |
| 2,931,539 | 4/1960 | Maxey | 222/130 |
| 2,944,707 | 7/1960 | Steinmetz | 222/254 |
| 3,005,578 | 10/1961 | Mainieri | 222/450 |
| 3,007,612 | 11/1961 | Tepper | 222/284 |
| 3,018,924 | 1/1962 | Reed | 222/48 |
| 3,100,589 | 8/1963 | Love, Jr. | 222/480 |
| 3,130,874 | 4/1964 | Bulmer | 222/142.8 |
| 3,269,612 | 8/1966 | Bode | 222/370 X |
| 3,695,487 | 10/1972 | Slayton et al. | 222/430 |

Primary Examiner—Joseph J. Rolla
Assistant Examiner—Kenneth Noland
Attorney, Agent, or Firm—Patrick M. Dwyer

[57] ABSTRACT

The present invention relates to a condiment measuring system which is compact, easy to store, and easy to manufacture. The device attaches to standard condiment containers and permits precise and easy measurement of predetermined quantities of condiment with no danger of over dispensing or spilling. In addition, measured quantities of condiment may be measured and stored for later dispensing while still being protected from environmental degradation. The device comprises a housing 10, a metering drum 20, drum retaining disk 30, selector disk 40, and plug 52. The central shaft 11 passes through housing 10 and drum 20 to dispense condiments without measuring, when plug 52 is removed. The device can be built to close tolerances for durability, effective sealing, and ease and smoothness of operation.

9 Claims, 3 Drawing Sheets

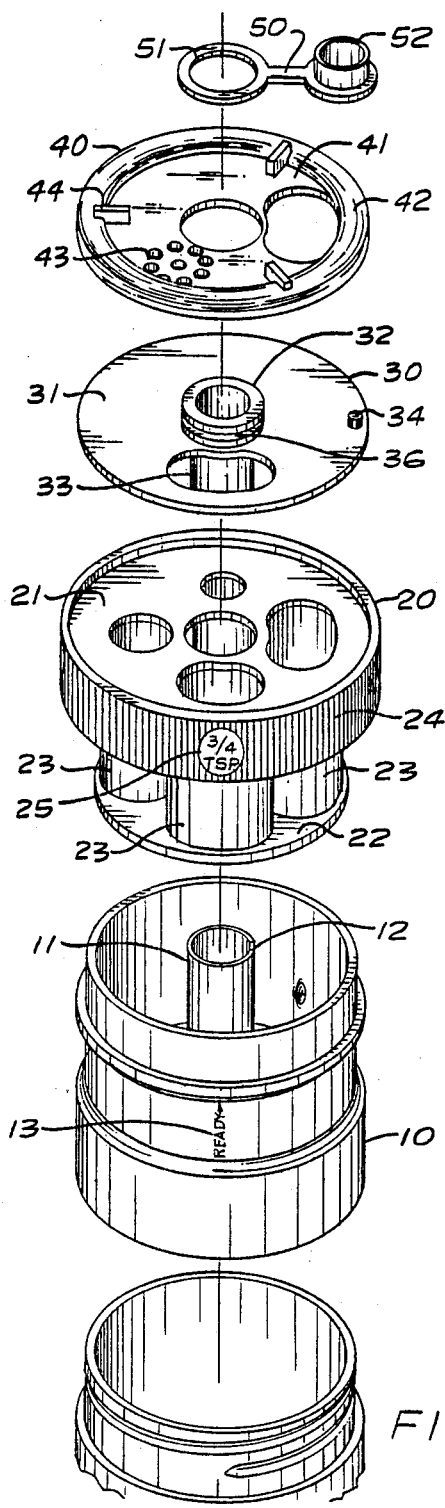
FIG. 1
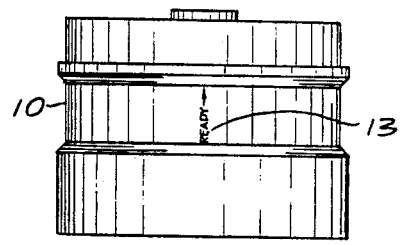
FIG. 2
FIG. 3

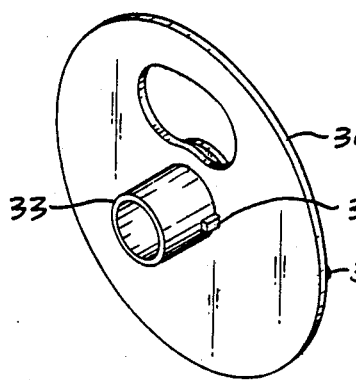
FIG. 9
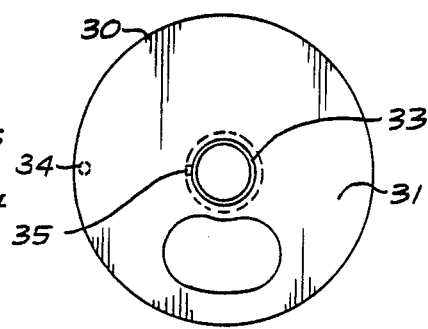
FIG. 10
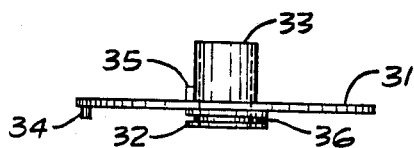
FIG. 11
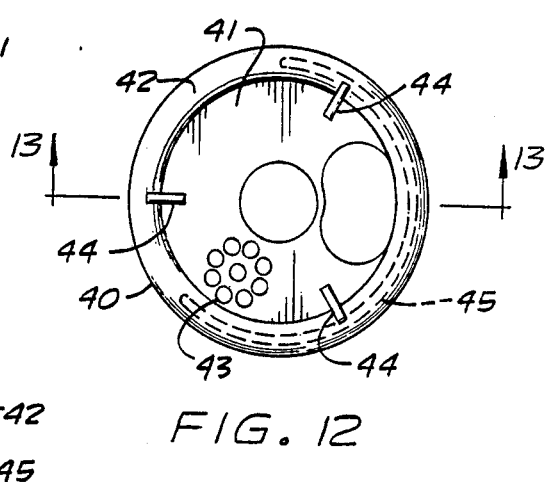
FIG. 12
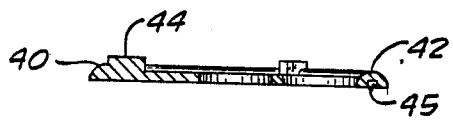
FIG. 13
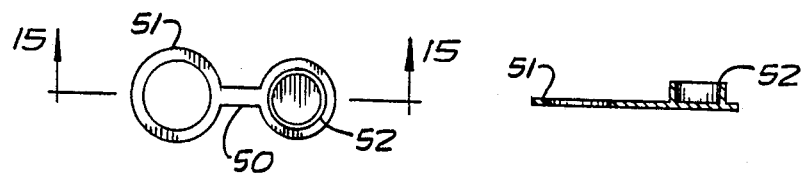
FIG. 14
FIG. 15

SELF-MEASURING CONDIMENT CAP

TECHNICAL FIELD

This invention relates to the field of culinary appliances and more particularly to devices adapted to dispense controlled amounts of condiments, especially those of a particulate nature during the preparation of foodstuffs. More particularly, this invention concerns an inexpensive, easy to manufacture and durable condiment jar cap so constructed that the user may elect to pour a continuous stream of particulate condiment matter or to pour a precisely premeasured condiment amount either in bulk or by sifting.

BACKGROUND ART

It is well known in prior art devices to mount a lid which comprises some kind of dispensing device onto a jar or other container of condiments or other particulate foodstuff matter. The devices are used primarily to meter or measure condiment into foodstuffs at the preparation stage. However, many of the devices are cumbersome, mechanically inefficient, or easily damaged during use and most are not capable of precision of measurement over an extended period of use. In addition, there is little user flexibility in selecting, while using the device, between a straight pouring of the condiment without measuring and a precise measurement of the condiments. Also most of the devices have no provision for precisely measuring quantities of condiment in the range of fractions of a teaspoon; moreover, those that do provide for measurements in that range do not also provide for storing the measured quantity in such a way that it can be inspected and retained in the measured position for subsequent use. Finally, none of the devices disclose an easy and convenient means for the average user to selectively engage different measuring subcomponents without complex visual inspection or complex physical manipulations.

DISCLOSURE OF INVENTION

The present invention differs from most of the prior art in that it is compact and light and it contains symmetrical parts which facilitate low cost, high quality injection molding. It contains only a single valve mechanism, which mechanism itself has no moving parts so that its operation is both efficient and trouble free through long use. It is easily disassembled for cleaning. The invention allows the storage of a variably predetermined measured amount of condiment in an upright position for immediate or subsequent use and without additional inspection or measuring. The invention allows for a visual preinspection of the measured amount just prior to use to ensure that the measuring chamber is full and contains the appropriate condiment.

In addition, the invention allows the user to select either a "pour" or a "sift" option by the rotation of a single easy to use disk. The invention differs also in that the rotating metering parts of the invention are corralled within a rigid metering housing which housing is also the cap housing for the invention. This corralling prevents lateral displacement of the metering components within the housing and permits the use of very close working tolerances which in turn promote trouble free long life, extremely effective internal sealing, and precision of measurement during use.

The invention also differs in that it contains in the preferred embodiment, as an integral part of the housing in which the metering mechanism rotates, a central pour through passage which permits the dispensing of unlimited amounts of condiment directly from the container into the preparation of food without removing the cap from the condiment container. This pour through passage is removably plugged to prevent accidental spills or discharge.

Finally, the close tolerances and smooth surfaces of the working parts of the invention, together with the use of a spring loaded hemispherical detent system, permit a very smooth operating valve system that clicks into place, thereby ensuring the selection and correct engagement of a measuring tube without precise visual verification.

The apparatus of this invention comprises a housing having means therein to mount said housing upon a threaded container opening. Within the housing is mounted a rotatable metering means in any one of several possible configurations such that when the rotatable metering means is mounted within the housing one or more measuring voids are formed. The metering means and the housing are so designed and constructed that when each of these measuring voids is filled, it contains a precisely measured quantity of condiment. In the preferred embodiment of this invention, the center of the metering means is hollow to accommodate a shaft located centrally in the housing. This shaft is preferably hollow and open at both ends to allow the passage of condiment material directly from the container to bypass the metering means. Also in the preferred embodiment the metering means is in the shape of a drum and the metering voids take the form of individual tubes which are joined together in the metering drum by two thin disks mounted at either end of the parallel tubes. However, it should be obvious that many different shapes of rotatable metering means including non drum shaped metering means, when mounted within the housing, will serve to create the required measuring voids.

The housing may have one or more openings through a bottom disk which forms a partition between the threaded portion of the housing and the upper portion of the housing in which the metering means rotates, which openings permit the passage of condiment matter from the container selectably into one or more of the measuring voids. The preferred embodiment contains only one such opening over which a selected measuring tube may be aligned and filled when the container is inverted.

The metering means is held in place within the housing by a retaining means which is attached to the housing. The retaining means is disk shaped and sized to block off the upper end of all measuring voids when the invention is inverted. In the preferred embodiment, this retaining disk is attached directly to the shaft in the center of the housing, preferably by pressing a corresponding central hollow shaft portion of the retaining disk into the upper opening of the central axial passage of the housing. Of course the retaining disk could also be attached directly to the housing's circumference, or to a central shaft in the housing which is not hollow. Also in the preferred embodiment, the central shaft of the retaining disk is also hollow so that even when the retaining disk shaft is pressed into the opening of the housing's central axial passage, an open passage is still maintained through which condiment matter may be poured when the container is inverted.

The retaining disk has an opening which is offset from the corresponding opening in the bottom disk of the housing so that when the container is inverted the upper end of any particular tube being filled is thereby closed during the filling process. Then in the preferred embodiment, when the metering drum is rotated while the container is still inverted, the filled tube may be selectively aligned with the opening in the retaining disk to allow for discharge of the measured amount of condiment. This same rotation of the metering drum also closes the container end of the tube if the measured quantity of condiment is to be stored or visually inspected. Preferably this offset is maintained by having the retaining disk shaft keyed or splined to the central axial passage of the housing in any well known manner.

Mounted atop said retaining disk is a rotatable selector disk divided into a plurality of segments, one of which segments is closed and one of which is open. Preferably, there is also an opening in a sift hole pattern in one of these segments such that rotation of the selector disk aligns successively (1) the closed portion to cutoff the pouring of measured amounts, (2) the open portion to allow the dispensing of the measured amounts without sifting, or (3) the sift hole pattern to allow the sifting of the measured amount. Alignment of the "closed" segment and of the "open" segment, respectively, with visual verification by the user is facilitated in the preferred embodiment by a groove on the underside of the selector disk's circumference and a corresponding limiting pin on the upper circumferential surface of the retaining disk. Finally, the central axle passage is capped with a center plug made of flexible materials such that the passage may be easily plugged and unplugged by finger pressure. In the preferred embodiment, this plug is flexibly attached to the retaining disk so that it will not be lost when the plug is left uninserted.

In the preferred embodiment the user attaches the invention to an existing jar of powdered or particulate condiments by engaging the threads of the cap's housing with the threads of the container of condiments. Alternatively, if the condiments are purchased in a container which does not have the appropriate threaded neck, the condiments may first be transferred in bulk to a condiment container which has been manufactured with a threaded neck to mate with the condiment cap.

In the preferred embodiment, when the user desires to measure a specific amount of condiment a metering drum is rotated by means of finger twisting action on a knurled plastic rim of the metering drum to rotate the metering drum into the desired measuring position. Each of the four measuring positions will be stopped at the correctly aligned location by the detent mechanism which is integral to the drum housing and drum. Additionally, an indicator marking with the word "measure" on the drum housing will align with the fractional teaspoon measurement marking on the knurled rim portion of the drum housing so that the user may be visually sure of which measurement has been selected.

The selection of a particular measuring tube within the metering drum by the above procedure causes the particular measuring tube to be aligned with the dispensing hole in the bottom of the drum housing, and radially offset from the dispensing hole in the drum retaining disk. In the preferred embodiment, this offset is 90 degrees. Thus, when the container and cap assembly are inverted and the selector disk has been moved to the blank or closed position to cover up the dispensing opening in the drum retaining disk, the selected measurement tube becomes filled with the condiment material contained in the jar. When the selected tube has been filled in this inverted position the entire metering drum is rotated to the "ready" position while the bottle is still inverted. This rotation screeds the ingredients being measured in the selected tube and then creates a platform to support the now measured ingredients so that the bottle may be returned to its upright position without causing the measured quantity to fall back into the jar. In this way the measured amount of condiment may be retained in the uprightly positioned bottle for an indefinite period of time prior to actually dispensing the measured amount into the food preparation process.

When the user desires to either inspect the contents of the measured tube or to dispense the contents, the user merely rotates the selector disk to the open dispensing or sift dispensing positions and proceeds with the inspection or dispensing operation.

Should the user desire to pour a quantity of the condiment directly out of the container without going through the measuring process, either because a much larger measured amount is required or because the user does not desire any measurement of the condiment amount, the center plug is merely unsnapped by the action of the fingers, thus opening the central axial passage directly to the condiment container. The container and cap assembly then are simply inverted to allow the jar contents to be poured directly into the food preparing process or into the larger measuring container.

If the user does not wish to store the measured material prior to dispensing it into the food preparation process nor to inspect the contents of the measuring tube, it is not necessary with this invention to place the jar in the upright position at all prior to dispensing. It is only necessary to perform the 90 degree rotation of the metering drum to move the filled measuring tube into the "ready" position to thus close off the filled measuring tube from the condiment jar interior and then, while holding the jar in the inverted position, to move the selector disk, or have previously moved it, to the sift dispensing or pour dispensing position with the jar inverted to discharge the contents of the selected measuring tube. A further benefit is that the central axial pour passage may be utilized regardless of whether or not there is already condiment stored in one of the measuring tubes.

BRIEF DESCRIPTION OF THE DRAWINGS

FIG. 1 is an exploded perspective view of the invention engaged upon a typical condiment container.

FIG. 2 is an oblique perspective view of the metering drum housing.

FIG. 3 is a side view of the metering drum housing.

FIG. 9 is an oblique bottom view of the metering drum retaining disk.

FIG. 10 is a plan view of the retaining disk shown in the inverted position.

FIG. 11 is a side view of the retaining disk in the inverted position.

FIG. 12 is a plan view of the selector disk.

FIG. 13 is a cross sectional view of the selector disk shown in FIG. 12 taken along line 13—13.

FIG. 14 is a plan view of the retainer ring/plug.

FIG. 15 is a cross sectional view of the retainer ring/plug shown in FIG. 14 taken along line 15—15.

BEST MODE FOR CARRYING OUT THE INVENTION

Figure 4:
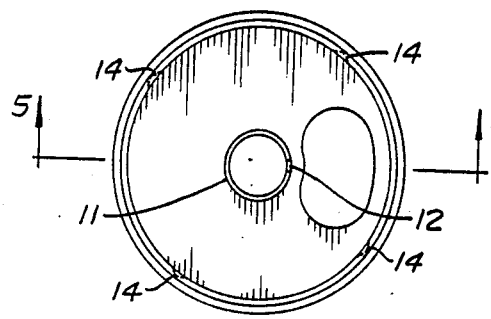
FIG. 4 is a plan view of the metering drum housing.

Referring now to the drawings, wherein like numbers indicate like parts, there is shown in FIGS. 1 through 15 a first and preferred embodiment of this invention, which can be constructed of a variety of injection molded plastic materials, shown ready for attachment to a typical threaded container opening.

A metering drum housing 10, shown in FIGS. 1 and 2-5, having standard female jar threads 16, is adapted to be threadably engaged on to a standard condiment container. The metering drum housing is generally an open cylinder in shape which is partially closed just above the female threads by a bottom disk 15. In the bottom disk there is a kidney shaped opening to permit the passage of condiment material from within the closed condiment jar. There is also central axial passage 11, open at both ends, which projects upwardly from the center of the bottom disk 15 which shaft also permits the passage of condiment material from within the closed jar.

Coaxially and slidably mounted upon the hollow shaft 11 is a metering drum 20, shown in FIGS. 1 and 6-8. The metering drum is thereby free to rotate through 360 degrees within the housing and about the axially positioned hollow shaft.

The metering drum 20, in this preferred embodiment, comprises four measuring tubes 23, each of equal length, each tube enclosing, when assembled into the drum unit and sealed at both ends, a specific measured volume. In the preferred embodiment, the volumes of the tubes are ¼ tsp., ½ tsp., ¾ tsp., and 1 tsp. The measuring tubes are radially spaced on parallel axes at arcs of 90 degrees within the drum and axially equidistant from the axis of the drum itself. The four tubes are rigidly contained within the drum structure by an upper drum disk 21 and a lower drum disk 22, both of which are bonded or perhaps integrally molded to the ends of the measuring tubes. The lower drum disk has openings corresponding in shape and size to the respective tube openings in order to permit free passage of condiment material from the container, through the opening in the housing, and into any selected tube when that tube is selectably aligned with the opening in the housing. Similarly, the upper drum disk also has corresponding openings to permit dispensing of the condiment from the tubes when they are selectably aligned in the dispensing position.

The metering drum further comprises a detent positioning mechanism which comprises a detent finger 26 which projects upwardly from the upper circumferential surface of the lower drum disk at a point 215 degrees from the center of the largest measuring tube, and a detent hemisphere 27 which projects radially outwardly from the detent finger. The detent hemisphere frictionally engages and disengages, against the spring tension of the finger, with four corresponding and equally spaced hemispherical detent indentations 14, shown in FIGS. 4 and 5, on the inside cylindrical surface of the drum housing which are radially positioned on that surface at 35, 125, 215, and 305 degrees respectively from the center of the opening in the drum housing's bottom disk 15.

The metering drum further comprises a knurled grip ring 24 integral to the circumference of the upper drum disk 21. Central axial openings in both upper and lower drum disks permit the drum to rotate within the housing 10 without interference with the central axial passage 11. By means of the grip ring and detent system, the drum may be manually rotated within the housing in discrete 90 degree arcs, thereby insuring accurate alignment of each of the tubes respectively with the opening in the drum housing bottom disk 15 without any visual correlation by the user. All dimensional tolerances are close to enable effective sealing of the measuring tubes, to prevent binding, and to promote smooth, efficient mechanical operation of the moveable parts of the invention. The diameter of lower drum disk 22 corresponds to the inside diameter of the drum housing 10, and the inside diameter of grip ring 24 corresponds with the outside diameter of housing 10 to create a corralling effect which minimizes play and wobble of drum 20 within housing 10, thus ensuring tight sealing of tubes 23 against bottom disk 15 and retaining disk 30.

Coaxially mounted within the upper end of central axial passage 11, and spanning the upper open end of the drum housing 10 to hold the drum 20 in place once it is mounted within the housing is the metering drum retaining disk 30, shown in FIGS. 1 and 9-11. The retaining disk 30 comprises a disk 31 integrally molded to an upper disk shaft 32 and lower disk shaft 33. Lower disk shaft 33 is cylindrical and its outer dimension is sized to be a press fit within the inner dimension of central axial passage 11. A cylindrical hollow bore passes from the bottom of lower shaft 33 to the top of upper shaft 32 so as to extend central axial passage 11. After the drum 20 has been slidably engaged with the housing 10, the retaining disk 30 is installed so that the lower disk shaft 33 is pressed into the upper bore of central axial passage 11 and so that the lower surface of disk 31 is flush with the top surface of the upper drum disk 21. After installation of the retaining disk 30, there should be no appreciable end play of the measuring drum 20 upon the drum housing hollow shaft 11.

Figure 5:
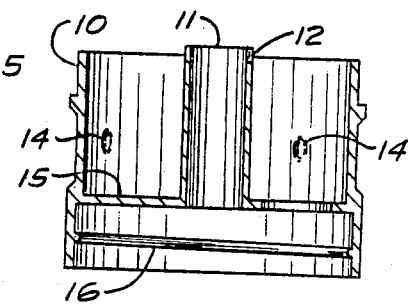
FIG. 5 is a cross sectional view of the metering drum housing shown in FIG. 2-4 taken along line 5—5 of FIG. 4.

The disk 31 has an opening identically sized to the opening in the drum housing bottom disk 15. However, the opening in the retaining disk 31 is offset relative to the opening in the housing bottom disk 15 by 90 degrees. This offset is for the purpose of effecting the measure/retain function of the invention as described above in the disclosure. The offset is ensured during assembly of the invention by the presence of an alignment key 35 integrally molded into the outer circumference of the lower disk shaft 33, which meshes into a corresponding alignment notch 12 in the drum housing central passage 11, which is shown in FIGS. 2, 4 and 5. Notch 12 is centered on the zero degree center of the opening in bottom disk 15 and the center of the opening in disk 31 is offset 90 degrees clockwise from the center of key 35.

Rotatably mounted upon hollow upper disk shaft 32 is a selector disk 40 shown in FIGS. 1 and 12-13, which depending upon the rotational position of the selector disk, either closes off the opening in the disk 31, or permits the dispensing of the contents of the measuring tube which is aligned below the opening in retaining disk 31 by either sifting or pouring respectively.

Selector disk 40 comprises a molded disk 41, a circumferential upwardly projecting convex rib 42 for torsional rigidity, grip tabs 44 to facilitate hand rotation of the disk and stacking of multiple containers, an opening identical in size to the opening in the disk 31 and to the opening in drum housing 10, and a circular pattern of sift holes radially positioned at 120 degrees relative to the center of the larger opening. The center of the "sift" pattern and the center of the larger or "pour" opening are equidistant from the center of the selector disk.

Selector disk 40 further comprises in its under surface beneath convex rib 42, a rectangularly cross sectioned groove 45 which is swept counterclockwise through an arc of 229 degrees, beginning 138 degrees clockwise of the center of the "pour" opening and ending 269 degrees clockwise of that center. Groove 45 rides upon a stop pin 34 projecting correspondingly upwardly from the upper surface of the disk 31. The stop pin limits the full rotation of the selector disk 40 to either a completely "closed" position or to an accurately aligned "pour" position. Movement from either position can only be accomplished in a single direction of rotation.

The selector disk 40 is retained upon upper disk shaft 32 of the retaining disk 30 by a retaining ring/plug member 50, shown in FIGS. 1 and 14-15, which is molded from a resilient and more flexible plastic material than the other parts of the invention. This member comprises a retaining ring 51 internally sized to fit within a corresponding groove 36 on the upper disk shaft 32, shown in FIG. 11, by stretching ring 51 over the outer diameter of upper disk shaft 32 and snapping it into place within the groove 36. This member further comprises a plug 52 attached by an integral flexible strand to the ring 51. The plug 52 is a resilient cylinder closed at one end. It has an outer diameter sized to be a press fit into the inner dimension of the retaining disk's hollow upper disk shaft 32. When the plug is inserted into the upper disk shaft, the drum housing hollow shaft 11 is effectively sealed to prevent condiment matter from pouring out when the jar/cap assembly is inverted. When unmetered pouring is desired, plug 52 is removed and the cap/jar assembly is inverted.

Figure 6:
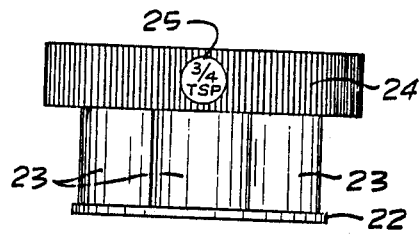
FIG. 6 is a side view of the metering drum.
Figure 7:
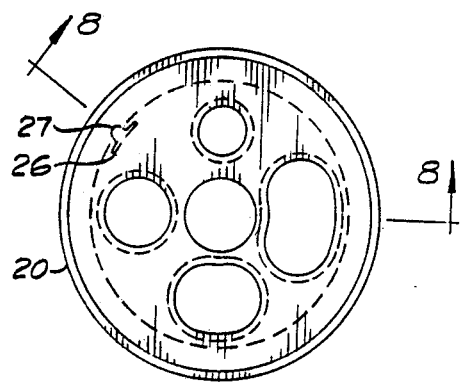
FIG. 7 is a plan view of the metering drum.
Figure 8:
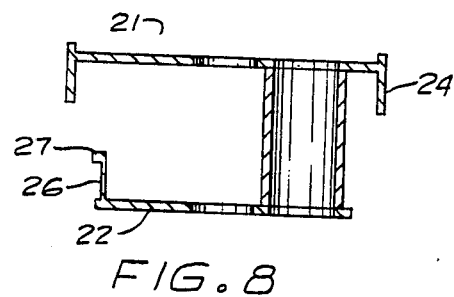
FIG. 8 is a special cross sectional view of the metering drum shown in FIGS. 6-7 taken along line 8—8 of FIG. 7 which shows only those features actually cut by line 8—8.

In operation, in addition to the hollow shaft 11 pouring option above, the condiment matter may be measured and dispensed as follows:

1. The assembled invention is securely screwed upon a jar containing particulate condiment matter. Multiple caps will permit each condiment jar to become self-measuring.
2. The desired measuring tube, for instance ¾ tsp., is selected by rotating the knurled grip ring 24 of the measuring drum 20 with the fingers of one hand while holding the jar in the other hand. The rotation proceeds through 90 degree detent clicks until a "3/4 tsp." indicator 25 embossed on the knurled ring as shown in FIGS. 1 and 6 is aligned with a "measure" position indicator embossed on the outer surface of the drum housing and centered at the opening in bottom disk 15.
3. The jar/cap assembly s then inverted, the ¾ tsp. tube is gravity filled by particulate condiment matter, and the knurled ring is twisted 90 degrees clockwise to the detent click. This positioning may be verified visually by checking for alignment of the "¾ tsp." embossment 25 with the "ready" position indicator 13 embossed on the drum housing 90 degrees clockwise of the "measure" indicator.
4. If immediate, uninspected dispensing of the measured condiment is desired, the appropriate "sift" or "pour" opening of the selector disk 40 will have been previously rotated into position over the opening in the retaining disk 30. Then, as soon as the measuring tube begins to click into place in the "ready" position, the condiment will begin to dispense.
5. If it is desired that the measured condiment be retained for later dispensing and/or visual inspection of the tube's contents to verify the condiment and the amount of fill, the selector disk 40 will have been previously rotated to the "closed" position before rotating knurled ring 24 to the "ready" position.
6. The jar/cap assembly is then uprighted for storage of retained measured amount or for later measuring operations. The hollow shaft 11 pour option may be exercised whether or not there is a measured amount retained in readiness within the cap.

INDUSTRIAL APPLICABILITY

The invention described herein finds use as an aid to food preparation both within the home and within commercial or industrial food preparation facilities. Wide use of the invention in any of the above settings will result in large savings of time during condiment measuring operations and will also result in increased sanitation because the condiment materials are not exposed to possible contamination at any time prior to actual dispensing into the food preparation process. The invention may be easily disassembled for cleaning. Furthermore, in any of the above settings the invention will promote uniformity of flavor from one recipe preparation to the next because all condiment amounts may be more precisely measured.

Because all of the parts of the invention are injection molded from common plastic materials and by well known industrial standards, the invention may be produced cost effectively and inexpensively, as well as durably, and should, therefore, find wide use in any of the above settings.

In compliance with statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A self-measuring condiment cap comprising:
   a housing means threadably adapted by well know thread means to be attached to the top of a typical threaded condiment container, said housing means being a hollow cylinder, closed at the lower end of said cylinder above said thread means by a bottom disk which has an opening to allow passage of matter from within said container to within an upper portion of said housing created by the partition of the bottom disk;
   a rotatable metering drum concentrically mounted within said housing means and sized such that said metering drum necessarily rotates about the central axis of said housing means, said metering drum having (1) a plurality of measuring tubes of equal length, each tube containing therein specific measured volumes, which tubes define at least two different volumetric capacities and are held in rigid relation to one another on parallel axes by being held between an upper drum disk and a lower drum disk, each of which said disks contains apertures permitting passage of the material being measured through either end of said tubes, said drum shaped such that, when mounted within said housing, it is nearly equal in height to the height of the upper rim of said housing, and (2) a gripping means whereby said rotor means may be rotated by the fingers of the user while said metering drum is securely mounted within said housing, such that a particular measuring tube may be selectably aligned over said opening in said bottom disk;

a means to retain said metering drum within said housing, said retaining means having an opening which is offset from said opening in said bottom disk by 90 degrees, and said retaining means having (1) a retaining disk sized to block off the open end of all said measuring tubes and (2) a fastening means attaching said retaining disk to said housing's upper open end;

wherein said housing means further comprises a shaft projecting upwardly from said bottom disk along the axis of said housing, about which shaft said metering drum is free to rotate within said housing and wherein said shaft projects above the upper rim of said housing and above the upper surface of said metering drum when mounted within said housing, and wherein said fastening means may be fixably attached to the upper projecting portion of said shaft.

2. The apparatus of claim 1, further comprising:
a selector disk rotatably mounted upon a portion of said shaft which protrudes above said retaining means when mounted upon a portion of said shaft which protrudes above said retaining means when mounted, said selector disk being divided into a plurality of arcuate segments, at least one of which segments contains an opening, and at least one of which segments contains no opening; and,
said selector disk having a means to rotate said selector disk by hand;
whereby the opening in said retaining means may be selectively blocked off or opened depending upon which of said segments of said selector disk cover said opening.

3. The apparatus of claim 1, further comprising a detent means comprising:

a detent finger projecting upwardly from the upper surface of said bottom drum disk near the circumference of said disk;
a detent hemisphere projecting outwardly from said detent finger such that said hemisphere projects beyond the circumference of said disk;
one or more corresponding hemispherical indentations in said housing into and out of which said detent hemisphere may be rotatably snapped.

4. The apparatus of claim 3, wherein said upper drum disk is substantially the same diameter as the outer diameter of said upper end of said housing cylinder and wherein said upper drum disk is free to rotate substantially flush with the upper lip of said housing cylinder and wherein said gripping means further comprises:
a knurled grip ring which is integral to the outer circumferential edge of said upper drum disk in such a way that it coaxially overlaps the outside surface of said housing at its upper end.

5. The apparatus of claim 4, wherein said central axial shaft in said housing is hollow and open at both ends to permit passage of condiment matter through said hollow passage.

6. The apparatus of claim 5, wherein said retaining disk of said metering drum retaining means further comprises a hollow shaft projecting axially above and below the plane of said retaining disk, the outer dimension of which shaft is sized below said retaining disk to be a press fit into the upper open end of said hollow shaft in the center of said housing, and which retaining disk shaft is such that said selector disk may be rotatably mounted upon the upper portion of said retaining disk shaft, whereby condiment matter may pass freely from said central axial passage of said housing and on through said hollow axial shaft of said retaining means.

7. The apparatus of claim 6, further comprising;
a circumferential groove upon said upper portion of said retaining disk shaft of said metering drum retaining means;
a resilient and elastic retaining ring means which may be snapped over the circumference of said upper portion of said shaft and into said groove to retain said selector disk in place; and,
a resilient plug means which may be removably inserted into the opening of said upper portion of said retaining disk shaft.

8. The apparatus of claim 6, further comprising a means to key said retaining disk shaft into said housing's central axial passage such that the opening of said retaining disk and said housing's bottom disk respectively are always offset by the requisite said 90 degrees.

9. The apparatus of claim 7, wherein said resilient plug means and said elastic retaining ring means are flexibly joined to one another such that neither of said means interferes with the function of the other.

* * * * *